United States Patent [19]

Harris et al.

[11] Patent Number: 5,643,451
[45] Date of Patent: Jul. 1, 1997

[54] FILTER BAG HAVING A RIM INTERMITTENTLY BONDED TO A POROUS PORTION

[75] Inventors: James L. Harris; James D. Jacobs, both of Hixson, Tenn.

[73] Assignee: Filter Specialists, Inc., Michigan City, Ind.

[21] Appl. No.: 688,511

[22] Filed: Jul. 30, 1996

[51] Int. Cl.⁶ .................................................. B01D 29/27
[52] U.S. Cl. .......................... 210/448; 210/452; 210/453; 55/379; 55/381; 55/382
[58] Field of Search ...................... 55/379, 381, 382; 210/448, 452, 453, 488

[56] References Cited

U.S. PATENT DOCUMENTS

| | | | |
|---|---|---|---|
| 4,159,187 | 6/1979 | Schuler et al. | 55/379 |
| 4,268,390 | 5/1981 | Cunningham | 210/448 |
| 4,460,468 | 7/1984 | Morgan | 210/453 |
| 4,921,606 | 5/1990 | Goldman | 210/448 |
| 5,188,731 | 2/1993 | LaPoint, Jr. | 210/448 |
| 5,437,910 | 8/1995 | Raabe et al. | 428/194 |

Primary Examiner—W. L. Walker
Attorney, Agent, or Firm—Baker & Daniels

[57] ABSTRACT

A liquid filter includes a housing and a filtering bag supported within the housing to remove soiled matter from processed fluids being filtered. The filter bag includes a rim and a pouch made out of a flexible material which is secured to the rim by a series of circumferencially spaced intermitted bonds. The bonds capture horizontal fibers of the filter bag as well as vertical fibers, thus resulting in a stronger bond and making it less likely a rupture will occur at the bond when stress is applied to the filtering bag, such as occurs when the bag is being removed from the housing during bag change over.

12 Claims, 2 Drawing Sheets

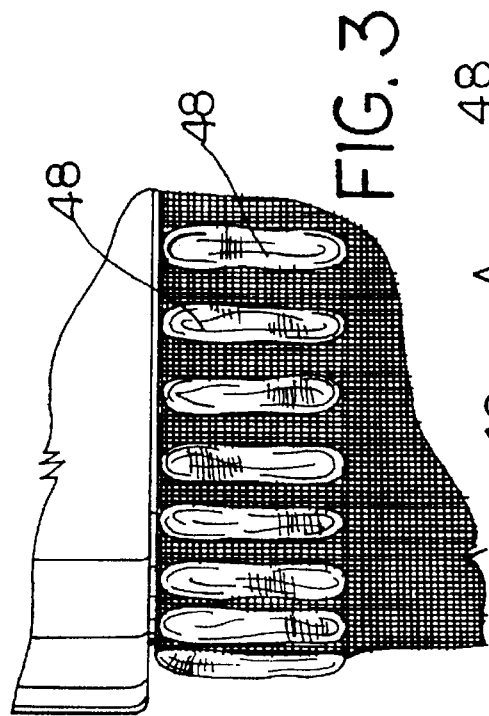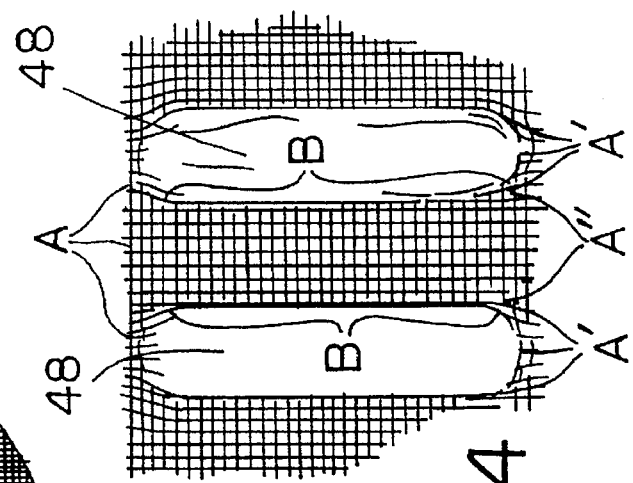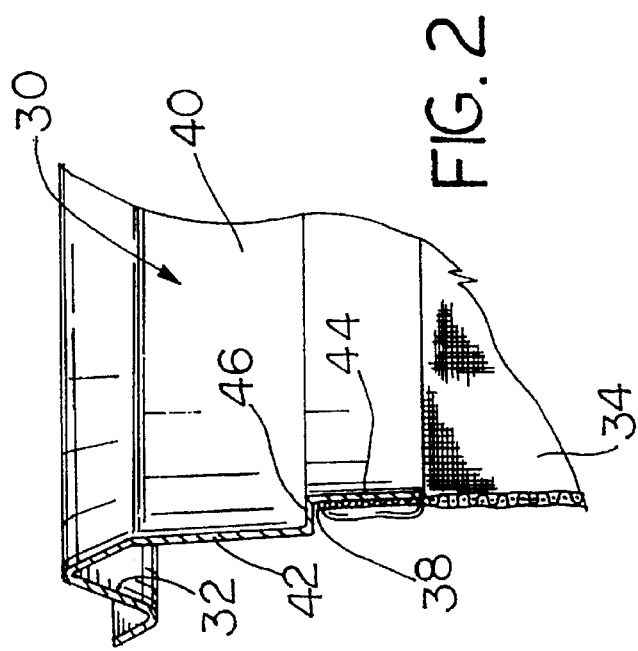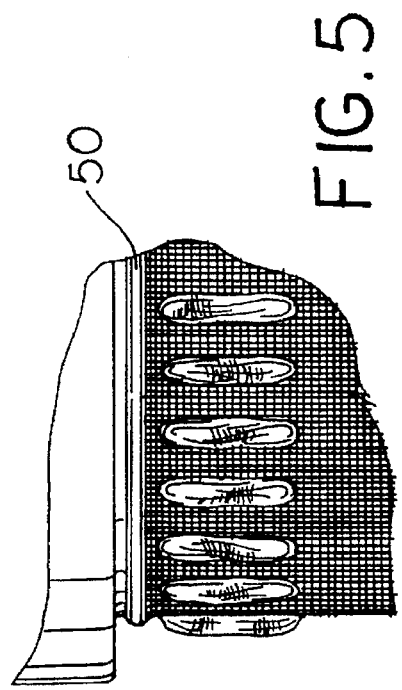

FILTER BAG HAVING A RIM INTERMITTENTLY BONDED TO A POROUS PORTION

This application relates to a liquid filter and a filter bag for such a liquid filter.

Liquid filters are often used commercially to remove solid matter from processing fluid. These filters normally include a large housing with an inlet and outlet adjacent opposite ends thereof. A filter bag is suspended within the housing. The filter bag includes a rim which is supported on the wall of the housing, and a pouch consisting of a flexible filter fabric, which may either be woven or nonwoven. The process fluid is communicated through the inlet and into the pouch through the opening defined by the rim, and passes through the pouch to the outlet, thereby removing the solid matter from the process fluid. The solid matter remains within the pouch. Accordingly, the filter bag must be changed periodically.

Changing the filter bag is often a difficult job, because the weight of the solid matter within the bag, and much of the weight of any process fluid in the bag during bag change over, must be removed from the housing with the bag. Accordingly, the joint between the pouch and the rim is critical, as the weight of the material in the bag often causes this joint to fail during changing of the filter bag. Heretofore, the pouch has been joined to the rim in a continuous circumferentially extending ultrasonic weld.

According to the present invention, the pouch of a filter bag is attached to the rim through a series of circumferentially spaced, intermittent ultrasonic bonds that extend axially with respect to the bag. These intermittent bonds capture a significant number of additional fibers of the pouch as compared to the continuous weld of the prior art, thus increasing the strength of the joint between the pouch and the rim and also permitting deflection or "give" in the joint between the pouch and the rim, thereby fully reducing the chance of rupture of the joint between the bag and the rim when the bag is put under stress, such as occurs when the bag is removed from the filter housing during bag change over.

These and other advantages of the present invention will become apparent from the following description, with reference to the accompanying drawings, in which:

FIG. 2 is an enlarged, fragmentary, cross sectional view taken substantially along lines 2—2 of FIG. 1;

FIG. 3 is an enlarged, fragmentary view of the circumscribed portion of FIG. 1 illustrating details of the joint between the pouch and the rim of the filter bag;

FIG. 4 is a substantially enlarged view of two of the bonds between the pouch and the rim of the filter bag; and FIG. 5 is a view similar to FIG. 3, but illustrating an alternate embodiment of the invention.

Figure 1:
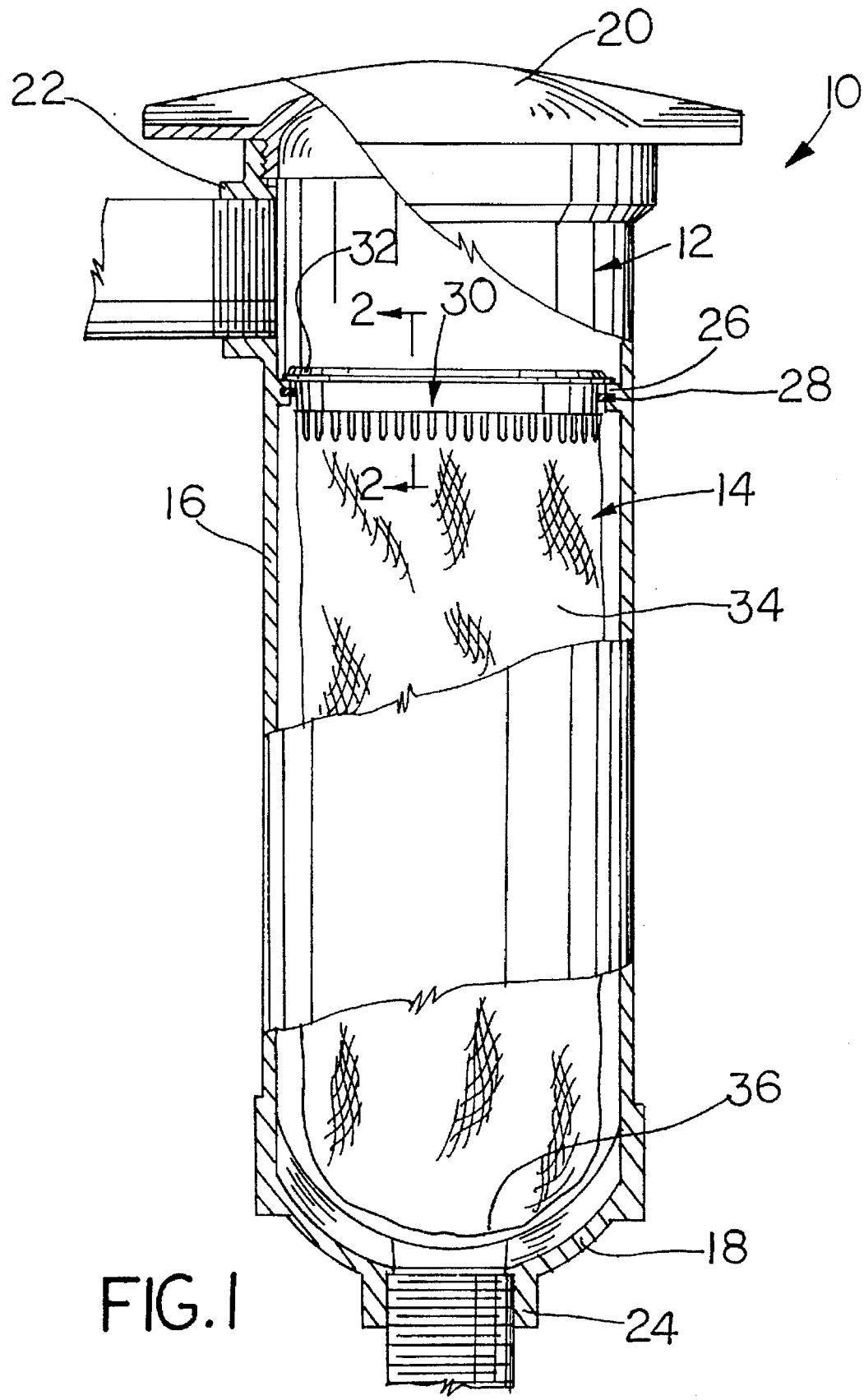
FIG. 1 is a fragmentary side elevational view, partly in section, of a filter housing and a filter bag made pursuant to the teachings of the present invention.

Referring now to the drawing, a liquid filter generally indicated by the numeral 10 includes a housing 12 which supports a filter bag 14 therewithin. The housing 12 includes a circumferentially extending side wall 16, a curved bottom wall 18, and a removable cap 20 which closes the end of the housing 12 opposite the end 18. The wall 16 defines an inlet opening 22 which receives fluid to be processed, and an outlet 24 is defined in the lower wall 18 for discharging processed fluid. Accordingly, the housing 12 defines a flow path which communicates the processed fluid between the inlet 22 and the outlet 24. A circumferentially extending, radially inwardly projecting support 26 is carried on the circumferentially extending wall 16 and projects into the flow path defined by the wall 16. Support 26 includes a circumferentially extending seal 28 for sealing against the rim 30 of filter bag 14.

The filter bag 14 includes the circumferentially extending rim 30, which includes a radially outwardly projecting portion 32 which is supported by the support 26 to hold the bag 14 in the position illustrated in FIG. 1. Bag 14 also includes a fluid permeable pouch 34 which consists of a fluid permeable material through which the fluid being filtered can pass, but which retains the solid contaminants that are to be removed from the fluid by filtration thereof. The material from which the pouch 34 is made may be either a woven or nonwoven material, although the material illustrated herein is a woven material. One end of the pouch 34 terminates in a closed end 36, and the other end of the pouch 34 terminates in an open end 38. The rim 30 includes an axially extending section 40 which includes a larger diameter portion 42 and a smaller diameter portion 44 with a shoulder 46 therebetween. The smaller diameter portion 44 is received within the open end 38 of the pouch 34, and it is preferred that the smaller diameter section 44 be such that the pouch 38 must be stretched at least somewhat in order to receive the smaller portion 44. The larger portion 42 defines a sealing surface which engages the seal 28.

The pouch 34 is secured to the smaller diameter portion 44 of the rim 30 through a series of circumferentially spaced, axially extending bonded areas 48 which provide intermittent bonds between the pouch and the portion 44 around the periphery of the rim 30. Bonds 48 are preferably formed by ultrasonic welding. For example, portion 44 of a rim 30 may be installed within the open end 38 of a pouch 34, and the assembly can then be placed on a conventional mandrel. A conventional ultrasonic horn, in which the horned surface has raised and lowered portions can then be used to apply ultrasonic energy to the portion of the open end 38 of the bag and the portion 44 of the rim to thereby form the ultrasonic welds or bonds indicated at 48. The process of ultrasonic welding of bags to rims is conventional, but generally continuous welds are formed around the periphery of the bag instead of the discontinuous welds of the present invention. It will be noted that the welds or bonds 48 extend substantially parallel or coaxial with the rim 32 and the bag 14 and that the length of each of the welds or bonds 48 along the axis of the bag is substantially greater than the circumferential spacing between the welds. It will also be noted that, because the welds or bonded areas 48 are spaced circumferentially, the sections of the pouch 34 between the welds or bonds 48 are unattached to the portion 44 of the rim 30. However, because of the relatively tight fit between the bag 14 and the portion 44, it is extremely unlikely that fluid being filtered can pass between the unbonded portions to bypass the filter bag. However, as illustrated in FIG. 5, an additional ultrasonic weld 48 can be applied between the portion 44 and the pouch 34 to provide complete assurance that fluid cannot bypass around the bonds 48. As will be discussed hereinafter, it is important that the ultrasonic weld 50 be placed between the bonded areas of 48 and the shoulder 46.

Referring to FIG. 4, which is a very much enlarged view of the weld 48 and the associated areas of the pouch 34, in prior art filter bags, in which the pouch was secured to the rim through a continuous circumferentially extend weld, only the vertical fibers A were captured in the weld. In the present invention, only some of the vertical extending fibers A, which have been woven together to create the fabric from which the pouch 34 is made, are captured in the welded or bonded areas 48. These fibers are indicated at A' in FIG. 4. The vertical fibers extending between the welded or bonded edges 48, indicated A" on FIG. 4, are not captured within the welded or bonded areas 48. However, the horizontally extending fibers, indicated at B in FIG. 4, are captured within the welds 48. Because of the attachment between the vertical fibers A" and the horizontal fibers B, capture of the horizontal fibers B within the welds also supports the vertical fibers A". Since the length of the welds or bonded areas 48 along the axis of the bag is much greater than the distance between the welds or bonded areas 48, many more horizontal fibers B will be captured within the welds or bonded areas 48 as compared to the vertical fibers A" captured in the conventional prior art continuous welding technique. Because more of the horizontal fibers B are captured than are the vertical fibers A", the weld between the pouch 34 and the rim 30 is much stronger than weld between the rim and pouch of prior art filter bags. Furthermore, some slight deflection of the fibers A" relative to the rim 30 is possible, thereby permitting some "give" in the vertical direction when the bag is being removed from the housing during filter change over. Accordingly, a much stronger bond is assured between the pouch and the rim, thus making a rupture between the pouch and the rim, which often occurred in bags of the prior art using a continuous weld securing the bag to the rim, less likely to occur. It will be noted that, even if a continuous weld 50 is used to assure that it is impossible for fluid to bypass around the rim, the weld 50 is placed between the bonded areas 48 and the shoulder 46, so that the primary bond is at the bonded areas 48. Accordingly, the bond 50 does not secure the pouch to the rim to any significant degree.

What is claimed is:

1. Liquid filter comprising a housing having an inlet for receiving fluid to be filtered and an outlet for discharging filtered fluid, said housing having a circumferentially extending wall defining a flow path between the inlet and the outlet, a filter bag supported in said flow path by said wall, said filter bag including a rim defining an open end of said bag and a porous portion extending from said rim whereby fluid from said inlet passes through said open end and then through the porous portion to said outlet, said rim and said porous portion being intermittently bonded to one another.

2. Liquid filter as claimed in claim 1, wherein said porous portion is attached to said rim by circumferentially spaced bonded areas.

3. Liquid filter as claimed in claim 2, wherein the sections of the porous portion extending between the bonded areas are unbonded to said rim.

4. Liquid filter as claimed in claim 2, wherein said bonded areas have axial and circumferential dimensions, the axial dimension being greater than the circumferential dimension.

5. Liquid filter as claimed in claim 2, wherein said rim extends circumferentially along said wall to define an axis, said porous portion defining a pouch including a circumferentially extending portion defining an open end, said rim including an axially projecting portion received within the open end of the pouch, said bonded areas being spaced circumferentially and securing said circumferentially extending portion of the pouch to the axially extending portion of the rim.

6. Liquid filter as claimed in claim 5, wherein said bonded areas extend coaxially with the axis of said rim and are spaced circumferentially from one another.

7. Liquid filter as claimed in claim 5, wherein said wall includes a support engaging said rim for supporting said bag within said housing.

8. Filter bag comprising a fluid impermeable, circumferentially extending rim and a fluid permeable pouch, said pouch including a circumferentially extending portion defining an open end, said rim including an axially projecting portion received within the open end of the pouch, said axially projecting portion and said pouch being intermittently bonded together.

9. Filter bag as claimed in claim 8, wherein said pouch is bonded to said axially projecting portion through circumferentially spaced bonded areas.

10. Filter bag as claimed in claim 9, wherein said pouch includes sections engaging said axially projecting portion and extending between said bonded areas, said sections being unattached to said projecting portion.

11. Filter bag as claimed in claim 10, wherein said bonded areas have axial and circumferential dimensions, the axial dimension being greater than the circumferential dimension.

12. Filter bag as claimed in claim 8, wherein said bonded areas extend coaxially with the axis of said rim and are spaced circumferentially from one another.

* * * * *